US012783300B2

(12) United States Patent
Aneja et al.

(10) Patent No.: US 12,783,300 B2
(45) Date of Patent: Nov. 3, 2026

(54) SYSTEM AND METHOD FOR DYNAMIC THROTTLING OF WORKFLOWS BASED ON INTEGRATED APPLICATIONS

(71) Applicant: ORACLE INTERNATIONAL CORPORATION, Redwood Shores, CA (US)

(72) Inventors: Sumit Aneja, Noida (IN); Anuj Kaushal, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1014 days.

(21) Appl. No.: 17/752,463

(22) Filed: May 24, 2022

(65) Prior Publication Data

US 2023/0385108 A1 Nov. 30, 2023

(51) Int. Cl.
*G06F 9/46* (2006.01)
*G06F 9/48* (2006.01)

(52) U.S. Cl.
CPC .................................. *G06F 9/4887* (2013.01)

(58) Field of Classification Search
CPC ..................................................... G06F 9/4887
See application file for complete search history.

(56) References Cited

U.S. PATENT DOCUMENTS

| | | | | |
|---|---|---|---|---|
| 8,468,251 | B1 | 6/2013 | Pijewski | |
| 10,193,819 | B2 | 1/2019 | Certain | |
| 11,146,624 | B2 | 10/2021 | Kona | |
| 2013/0173803 | A1 | 7/2013 | Pijewski | |
| 2017/0180254 | A1 | 6/2017 | Certain | |
| 2019/0182168 | A1 * | 6/2019 | Bastide | H04L 47/24 |
| 2020/0125977 | A1 * | 4/2020 | Andrabi | G06N 5/01 |
| 2021/0105317 | A1 | 4/2021 | Kona | |
| 2022/0345490 | A1 * | 10/2022 | Wu | H04L 67/10 |

OTHER PUBLICATIONS

WSO2, Introduction—WSO2 Integration Cloud—WSO2 Documentation, 2 pages, retrieved Apr. 14, 2022 from: <https://docs.wso2.com/display/IntegrationCloud/Introduction>.

WSO2, Integration Overview—WSO2 Api Manager Documentation 4.1.0 , 4 pages, retrieved Apr. 14, 2022, from: [https://apim.docs.wso2.com/en/latest/integrate/integration-overview/>.

WSO2, "Engaging a new Throttling Policy at Runtime", 4 pages, retrieved Apr. 14, 2022 from: <https://apim.docs.wso2.com/en/3.2.0/learn/rate-limiting/engaging-a-new-throttling-policy-at-runtime/>.

Kumara, Harsha, "Introducing WSO2 API Manager's Throttling Implementation Architecture", Sep. 29, 2016, 5 pages, retrieved Apr. 14, 2022 from: <https://wso2.com/library/articles/2016/09/article-introducing-wso2-api-managers-throttling-implementation-architecture/>.

(Continued)

*Primary Examiner* — Tammy E Lee

(74) *Attorney, Agent, or Firm* — TUCKER ELLIS LLP

(57) ABSTRACT

Embodiments described herein are generally related to cloud computing environments, and are particularly directed to systems and methods for dynamic throttling of workflows based on integrated applications. An integration cloud or platform-as-a-service (iPaaS) platform can enforce fixed limits for flows, and evolve the limits behavior based on responses from target applications, for example as sent within documented headers in their responses.

20 Claims, 16 Drawing Sheets

(56) References Cited

OTHER PUBLICATIONS

Microsoft, Azure Integration Services | Microsoft Azure, 3 pages, retrieved Apr. 14, 2022 from: <https://azure.microsoft.com/en-us/product-categories/integration/>.

Microsoft, "What is Azure Logic Apps?" Overview for Azure Logic Apps—Azure Logic Apps | Microsoft Docs , Feb. 9, 2022, 13 pages, retrieved Apr. 14, 2022 from: <https://docs.microsoft.com/en-us/azure/logic-apps/logic-apps-overview>.

Microsoft, "Handle throttling problems (429—"Too many requests" errors) in Azure Logic Apps" Feb. 25, 2022, 10 pages, retrieved Apr. 14, 2022 from: <https://docs.microsoft.com/en-us/azure/logic-apps/handle-throttling-problems-429-errors>.

The Genesys Cloud, "Rate Limits" Overview , 1 page retrieved Apr. 14, 2022 from: <https://developer.genesys.cloud/platform/api/rate-limits>.

Celigo, Celigo Integration Platform: iPaaS Application Integration Platform, 7 pages retrieved Apr. 14, 2022 from: <https://www.celigo.com/ipaas-integration-platform/>.

Celigo, "Amazon-NetSuite Error: "Request is Throttled"—Celigo Help Center" , 2 pages retrieved Apr. 14, 2022 from: <https://docs.celigo.com/hc/en-us/articles/360003126551-Amazon-NetSuite-Error-Request-is-Throttled->.

The Genesys Cloud, "Identifying rate limited requests", 1 page retrieved Apr. 14, 2022 from: <https://developer.genesys.cloud/platform/api/rate-limits#identifying-rate-limited-requests>.

BMC, BMC Helix, Solution Brief, 2 pages retrieved Apr. 14, 2022 from: <https://www.bmc.com/documents/solution-briefs/bmc-helix-ipaas.html>.

BMC, BMC Helix Integration Service | Designing and maintaining flows Documentation, 2 pages retrieved Apr. 14, 2022 from: <https://docs.bmc.com/docs/integrationService/designing-and-maintaining-flows-779839232.html>.

BMC, BMC Helix Integration Service / Configuring connectors "Adding throttling controls - Documentation for BMC Helix Integration Service", 2 pages retrieved Apr. 14, 2022 from: [https://docs.bmc.com/docs/integrationService/adding-throttling-controls-779839226.html>.

MuleSoft, A Salesform Company, "iPaas: Cloud Integration Platform | MuleSoft", 1 page retrieved Apr. 14, 2022 from: <https://www.mulesoft.com/resources/cloudhub/ipaas-integration-platform-as-a-service>.

MuleSoft, A Salesform Company, "Throttling and Rate Limiting | MuleSoft Documentation", 1 page retrieved Apr. 14, 2022 from: <https://docs.mulesoft.com/api-manager/2.x/policy-mule3-throttling-rate-limit>.

Zendesk Developers, "Best practices for avoiding rate limiting", 2 pages retrieved Apr. 14, 2022 from: <https://developer.zendesk.com/documentation/ticketing/using-the-zendesk-api/best-practices-for-avoiding-rate- limiting/>.

Google Cloud, Google Cloud Armor, "Rating limiting overview | Google Cloud Armor" , 2 pages retrieved Apr. 14, 2022 from: <https://cloud.google.com/armor/docs/rate-limiting-overview>.

Jayaraman, Gopal, "Apply rate-limiting to your resources using AWS Cloud-frong and WAF" , Halodoc, Jun. 22, 2020 , 5 pages retrieved Apr. 14, 2022 from: https://blogs.halodoc.io/apply-rate-limiting-to-your-resources-using-aws-cloud-front-and-waf/>.

TIBCO® API Exchange Gateway, "Throttles Overview" , 1 page retrieved Apr. 14, 2022 from: <https://docs.tibco.com/pub/api-exchange-gateway/2.2.1/doc/html/GUID-2F9EC52D-75FF-4AAB-B027-82DFDD1C9FD8.html>.

TIBCO® API Exchange Gateway, "Throttle Policies" , 1 page retrieved Apr. 14, 2022 from: <https://docs.tibco.com/pub/api-exchange-manager/2.3.3/doc/html/GUID-AE11DB3B-BF94-4C1B-9355-BODEOBBE73FD.html>.

TIBCO® API Exchange Gateway, "What is API Throttling", 2 pages retrieved Apr. 14, 2022 from: <https://www.tibco.com/reference-center/what-is-api-throttling>.

TIBCO® API Exchange Gateway, "Error" , 1 page retrieved Apr. 14, 2022 from: <https://docs.tibco.com/pub/api-exchange-gateway/2.2.0/doc/html/GUID-4C46B88C-2449-4B82-8822-49A82CB28D8D.html>.

Daniela L. Freire et al., "Survey on the run-time systems of enterprise application integration platform focusing on performance", Softw: Pract Exper. 2018;1-20 , wileyonlinelibrary.com/journal/spe, © 2018 John Wiley & Sons, Ltd., retrieved Apr. 14, 2022 from: <http://gca.unijui.edu.br/publication/3b3dbaf68507998acd6a5a5254ab2d76.pdf>.

Zendesk Developers, "Best practices for avoiding rate limiting", retrieved Apr. 14, 2022 from: <https://developer.zendesk.com/documentation/ticketing/using-the-zendesk-api/best-practices-for-avoiding-rate-limiting/>; 2 pages.

* cited by examiner

SYSTEM AND METHOD FOR DYNAMIC THROTTLING OF WORKFLOWS BASED ON INTEGRATED APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing environments, and are particularly directed to systems and methods for dynamic throttling of workflows based on integrated applications.

BACKGROUND

Generally described, an integration cloud platform enables the integration of various software products or applications, such as for example software-as-a-service (SaaS) applications and/or on-premises applications, which can then be made accessible to consumers via a cloud computing environment.

Some cloud environments offer an integration-platform-as-a-service (iPaaS) environment, and can support, for example, a web-based integration design tool for point-and-click configuration of the integration between the various applications, and a monitoring dashboard that provides real-time insight into transactions involving those applications. Such environments can be used to simplify the means by which a variety of otherwise different applications, technologies, and processes can be integrated to create business workflows that execute within the cloud.

An aspect of an iPaaS environment is the means by which external applications, technologies and processes can be integrated to create business workflows in the cloud. It is common for such participating external information systems to have some limits on their APIs to ensure fair usage. Typically these limits are decided based on customer subscription and complexity of API (e.g., time to process request, DB operations, CPU, memory), and once these limits are reached, these systems start to throttle incoming requests to protect from over-utilization.

In the context of iPaaS automated business workflows, this can lead to situations where the invocation of one of the external systems could fail when the system is throttling incomings requests, which results in the automated business workflows to be in an incomplete or sometimes inconsistent state. Such external systems may also impose penalties on the clients that are trying to send multiple requests, for example by imposing penalties such as blocking the user or the source application sending these requests. In the example of iPaaS automated business workflows, the source application may be the iPaaS environment itself which could face such penalties.

SUMMARY

Embodiments described herein are generally related to cloud computing environments, and are particularly directed to systems and methods for dynamic throttling of workflows based on integrated applications. An integration cloud or platform-as-a-service (iPaaS) platform can enforce fixed limits for flows, and evolve the limits behavior based on responses from target applications, for example as sent within documented headers in their responses.

DETAILED DESCRIPTION

Embodiments described herein are generally related to cloud computing environments, and are particularly directed to systems and methods for dynamic throttling of workflows based on integrated applications. An integration cloud or platform-as-a-service (iPaaS) platform can enforce fixed limits for flows, and evolve the limits behavior based on responses from target applications, for example as sent within documented headers in their responses.

Figure 1:
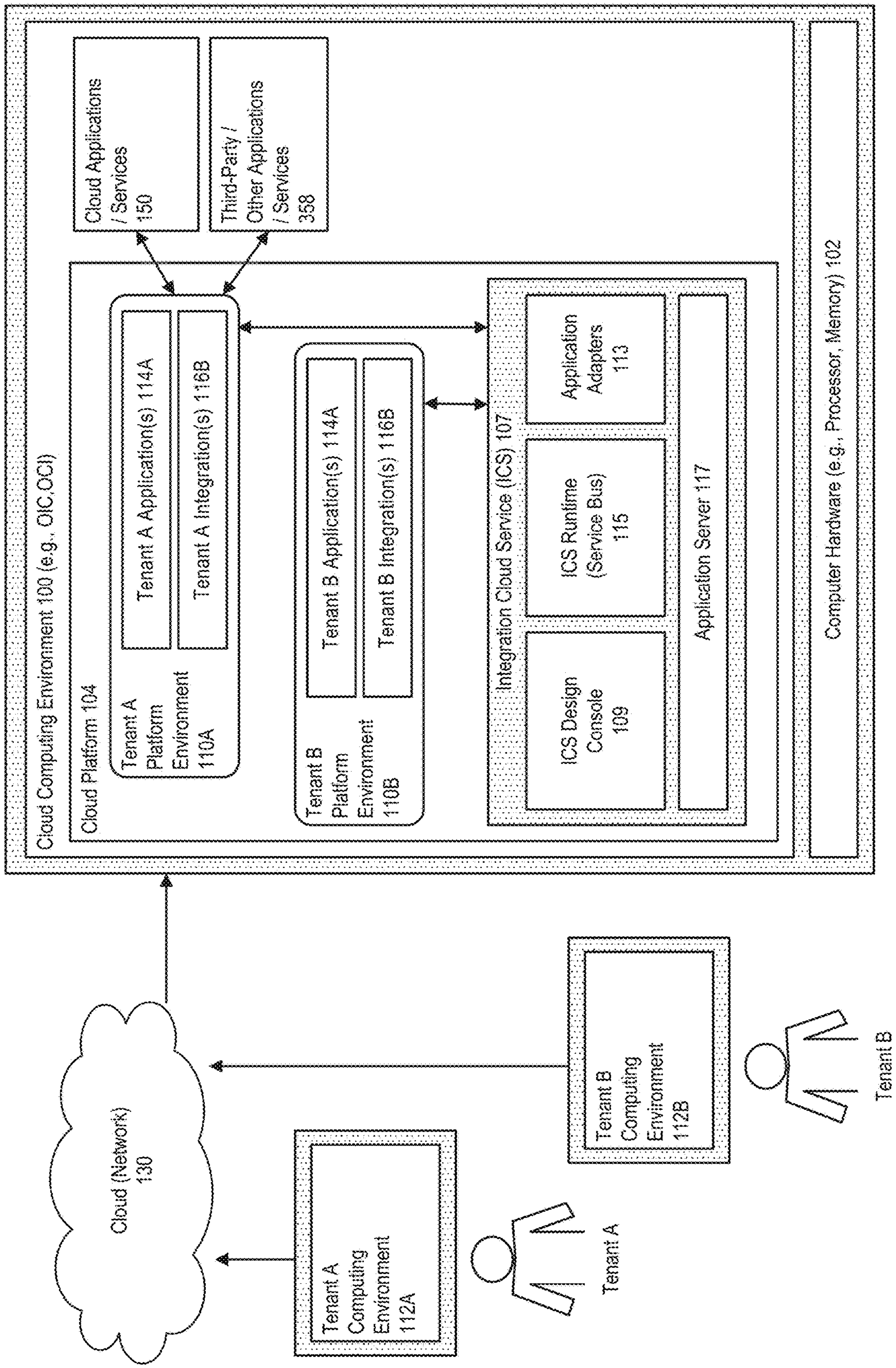
FIG. 1 illustrates an example cloud computing environment that provides an integration cloud service, in accordance with an embodiment.

FIG. 1 illustrates an example cloud computing environment that provides an integration cloud service, in accordance with an embodiment.

As illustrated in FIG. 1, in accordance with an embodiment, a cloud computing environment (cloud environment) 100, such as for example an integration cloud service (ICS), operating at one or more computers that includes a computer hardware (e.g., processor, memory) 102, can be used to provide a cloud computing platform (cloud platform) 104.

In accordance with an embodiment, examples of such a cloud environment and cloud platform can include Oracle Cloud, and Oracle Integration Cloud (010)/Oracle Cloud Integration (OCI) respectively. In accordance with various embodiments, the teachings described herein can also be used with other types of cloud environment or cloud platform, including, for example, other types of platform-as-a-service (PaaS) cloud environments or cloud platforms.

In accordance with an embodiment, each of a plurality of tenants of the cloud environment, for example a first tenant A, can be associated with a tenant platform environment 110, for use with the tenant's computing environment 112, and with one or more cloud software application(s) 114, and/or integration(s) 116. For example in accordance with an embodiment, the tenant can access their platform environment from an on-premise computing environment via a cloud computing environment 130 or other type of network or communication environment.

In accordance with an embodiment, a tenant platform environment can utilize one or more cloud software applications or services 150, or third-party or other software applications or services 158, provided by the cloud platform. The cloud platform can orchestrate use by the tenant platform environment, or by software applications executing therein, of various lifecycle activities provided within cloud platform.

In accordance with an embodiment, the integration cloud service 107 can include a design console 109, an integration cloud service runtime 115, and adapters 113 that simplify the task of configuring connections to applications, and execute on an application server 117 within the cloud environment. As further described below, the integration cloud service design console can provide a design time environment that allows a user to design, activate, manage, and monitor a workflow (e.g., a business workflow) that uses integration artifacts (e.g., an integration flow), that can then be deployed and executed on the integration cloud service runtime.

For example, in accordance with an embodiment, a cloud platform operating as an integration platform can orchestrate various software applications and multiple modules working together, such as, for example, activation, connection test, metadata loading, invoke target endpoint, transformation, request received by an integration, or various other types of modules; and can provide various lifecycle activities performed by these modules. During runtime, the modules can then execute the lifecycle activities to address various use-cases.

In accordance with an embodiment, the various components and processes illustrated in FIG. 1, and as further described herein with regard to various embodiments, can be provided as software or program code executable by a computer system or other type of processing device. For example, in accordance with an embodiment, the components and processes described herein can be provided by a cloud computing system, or by another suitably-programmed computer system.

Integration Cloud Service

Figure 2:
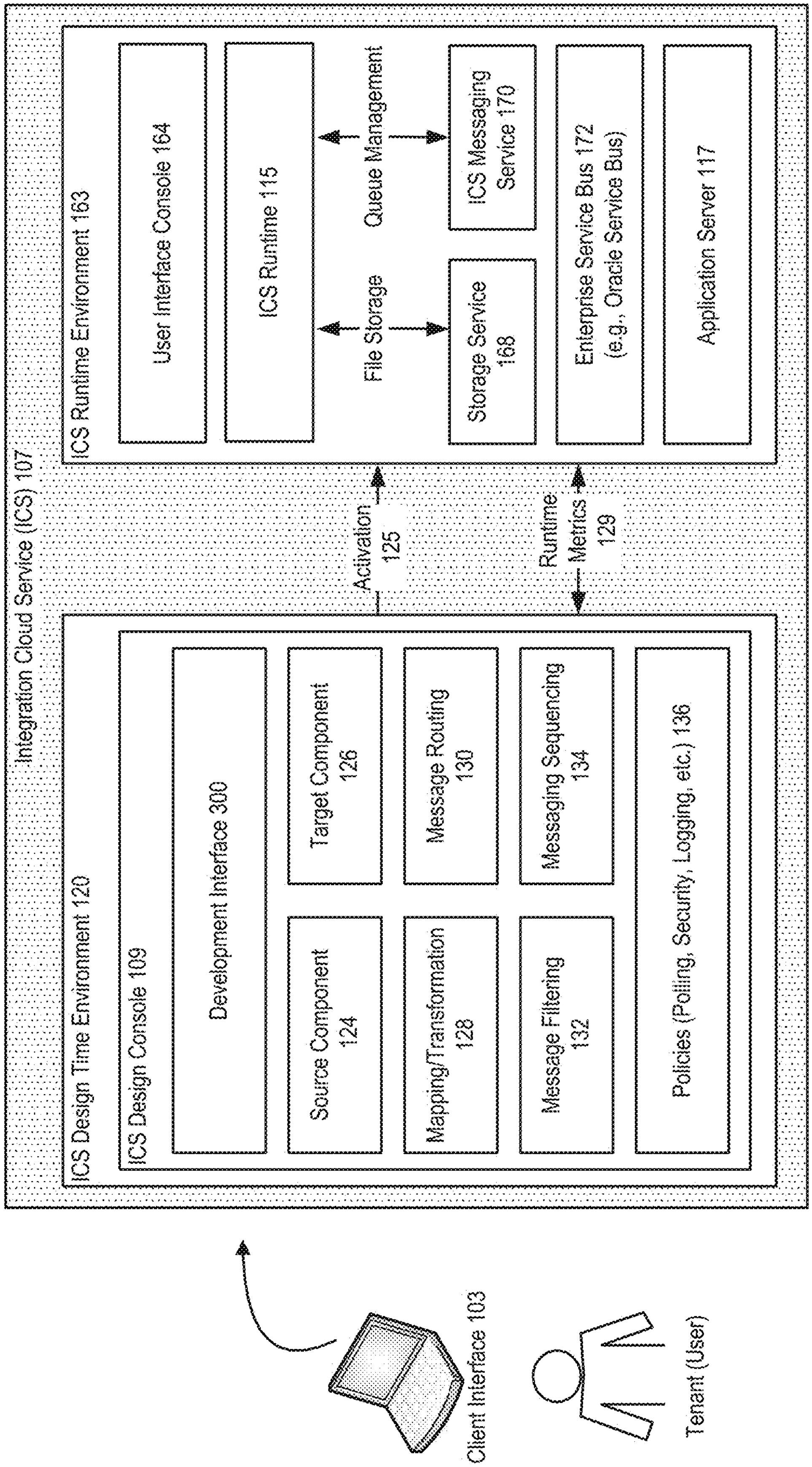
FIG. 2 further illustrates an example integration cloud service, in accordance with an embodiment.

FIG. 2 further illustrates an example integration cloud service, in accordance with an embodiment.

As described above, in accordance with an embodiment, the integration cloud service can include a design console, and an integration cloud service runtime, that together allow a user to design, activate, manage, and monitor a workflow that uses integration artifacts (e.g., an integration flow), that can then be deployed and executed on the integration cloud service runtime.

As illustrated in FIG. 2, in accordance with an embodiment, the design-time environment 120 can includes a development interface 300 which provides a browser-based or similar interface that allows an integration flow developer to build integrations using a client interface 103.

In accordance with an embodiment, the integration cloud service design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further illustrated in FIG. 2, in accordance with an embodiment, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of an integration flow definition/configuration.

In accordance with an embodiment, an integration flow definition specifies the details of an integration cloud service integration flow; and encompasses both the static constructs of the integration flow (for example, message routers), and the configurable aspects (for example, routing rules). A fully configured flow definition and other required artifacts (for example, JCA and .WSDL files) in combination can be referred to as an integration project, or integration archive. An integration archive can fully define an integration flow, and can be implemented by an underlying implementation layer.

In accordance with an embodiment, a policies component 136 can include a plurality of policies that govern behaviors of the integration cloud service environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during an integration flow execution for subsequent analysis via a monitoring console; and for message throttling used to define a number of instances that an enterprise service bus (ESB) service can spawn to accommodate requests. In addition, policies can be specified for monitoring/tracking an integration flow at an integration flow level;

and for validating messages being processed by the integration cloud service platform against a known schema.

In accordance with an embodiment, an integration developer can drag and drop a component on a development canvas 133 for editing and configuration, for use in designing an integration flow.

As further illustrated in FIG. 2, in accordance with an embodiment, the integration cloud service runtime environment 163 can include a storage service 168 and a messaging service 170 on top of an enterprise service bus component 172. The design-time environment can communicate with the runtime environment, or with a user interfaces console 164, to activate 125, and subsequently retrieves runtime metrics 129, or otherwise monitor and track performance of the integration cloud service runtime environment.

Figure 3:
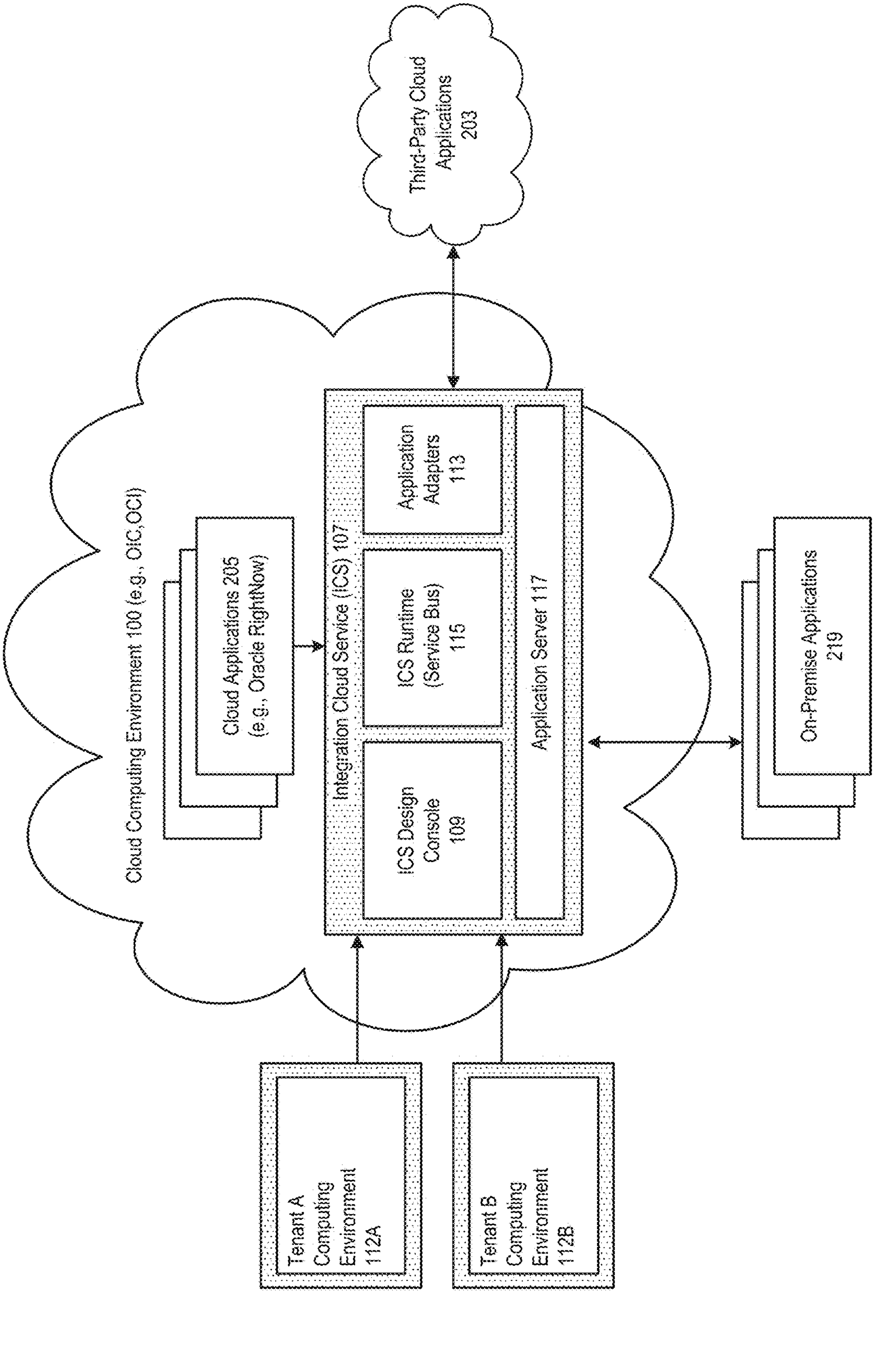
FIG. 3 further illustrates an example integration cloud service, in accordance with an embodiment.

FIG. 3 further illustrates an example integration cloud service, in accordance with an embodiment.

As illustrated in FIG. 3, in accordance with an embodiment, a plurality of application adapters can be provided to simplify the task of configuring connections to a plurality of applications, by handling the underlying complexities of connecting to those applications.

For example, in accordance with an embodiment, the applications can include one or more enterprise cloud applications of 205, third-party cloud applications (for example, Salesforce) 203, and on-premises applications 219. The integration cloud service can expose simple object access protocol (SOAP) and representational state transfer (REST) endpoints to these applications for use in communicating with these applications.

In accordance with an embodiment, an integration cloud service integration flow can include a source connection, a target connection, and field mappings between the two connections. Each connection can be based on an application adapter, and can include additional information required by the application adapter to communicate with a specific instance of an application.

In accordance with an embodiment, an integration cloud service integration flow and a plurality of other required artifacts (for example, JCA and WSDL files) can be compiled into an integration archive, which can be deployed and executed in the integration cloud service runtime.

In accordance with an embodiment, a plurality of different types of integration flow patterns can be created using the web UI application, including data mapping integration flows, publishing integration flows, and subscribing integration flows.

For example, in accordance with an embodiment, to create a data mapping integration flow, an integration cloud service user can use an application adapter or an application connection to define a source application and a target application in the development interface, and define routing paths and data mappings between the source and target application. In a publishing integration flow, a source application or a service can be configured to publish messages to the integration cloud service through a predefined messaging service. In a subscribing integration flow, a target application or service can be configured to subscribe to messages from the integration cloud service through the messaging service.

Figure 4:
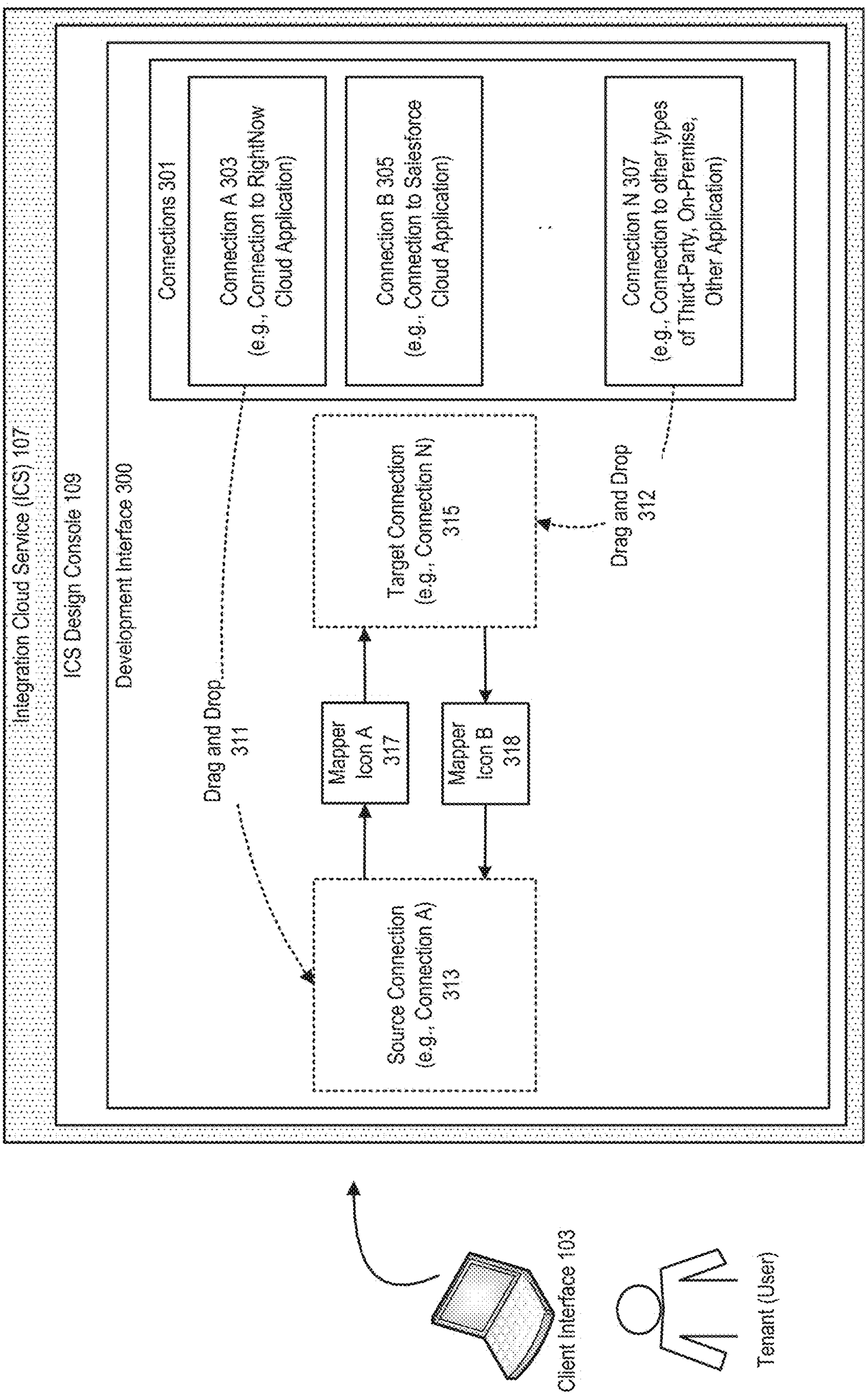
FIG. 4 illustrates an example integration cloud service design time, in accordance with an embodiment.

FIG. 4 illustrates an example integration cloud service design time, in accordance with an embodiment.

As illustrated in FIG. 4, in accordance with an embodiment, a development interface (e.g., a development canvas) can be used to create an ICS integration flow, using a plurality of existing connections 301, for example, connection A 303, connection B 305 and connection N 307.

As further illustrated in FIG. 4, in accordance with an embodiment, a particular connection (for example, connection A) can be dragged and dropped 311 to the development interface as a source connection 313, and connection N can be dragged and dropped 312 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappings (mappers) between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Determination and Use of Workflow Characteristics

In accordance with an embodiment, the systems and methods described herein can be used in determining workflow characteristics for use with an integration cloud service or other computing environment.

In accordance with an embodiment, an integration cloud service design console allows a user to design an integration flow that can then be deployed and executed by the integration cloud service runtime. A collection service can receive an indication of an integration archive that defines a business workflow or integration flow, wherein a characteristics server can then extract and persist the characteristics associated with the workflow, for subsequent use in providing a determination of workflows.

As described above, with a service-oriented design strategy, service reusability is a commonly-preferred design principle, and with such a design it may be beneficial to structure business workflows so that the workflows can be re-used across one or more business entities. To address this, some cloud vendors make available customer/consumer-agnostic or pre-built workflows to their platform consumers, through one or more paid or free channels.

Today's iPaaS providers are continuously striving to simplify how various applications, technologies, and processes can be integrated to create business workflows in the cloud. Increasingly, specialist third-party vendors are looking to provide similar pre-built workflows, under the general characterization of integration-software-as-a-service (iSaaS). Although some integration platforms provide tools for basic discoverability; a unified mechanism to discover workflows built by different individuals/companies, from different repositories, with a plurality of characteristics is not available.

In accordance with an embodiment, an integration platform that provides advanced discoverability of workflows provides an edge over other approaches, since it can allow consumers to search for workflows based on several dimensions, and additionally provide recommendations as to pre-built workflows, based on the existing characteristics of an integration platform consumer.

Figure 5:
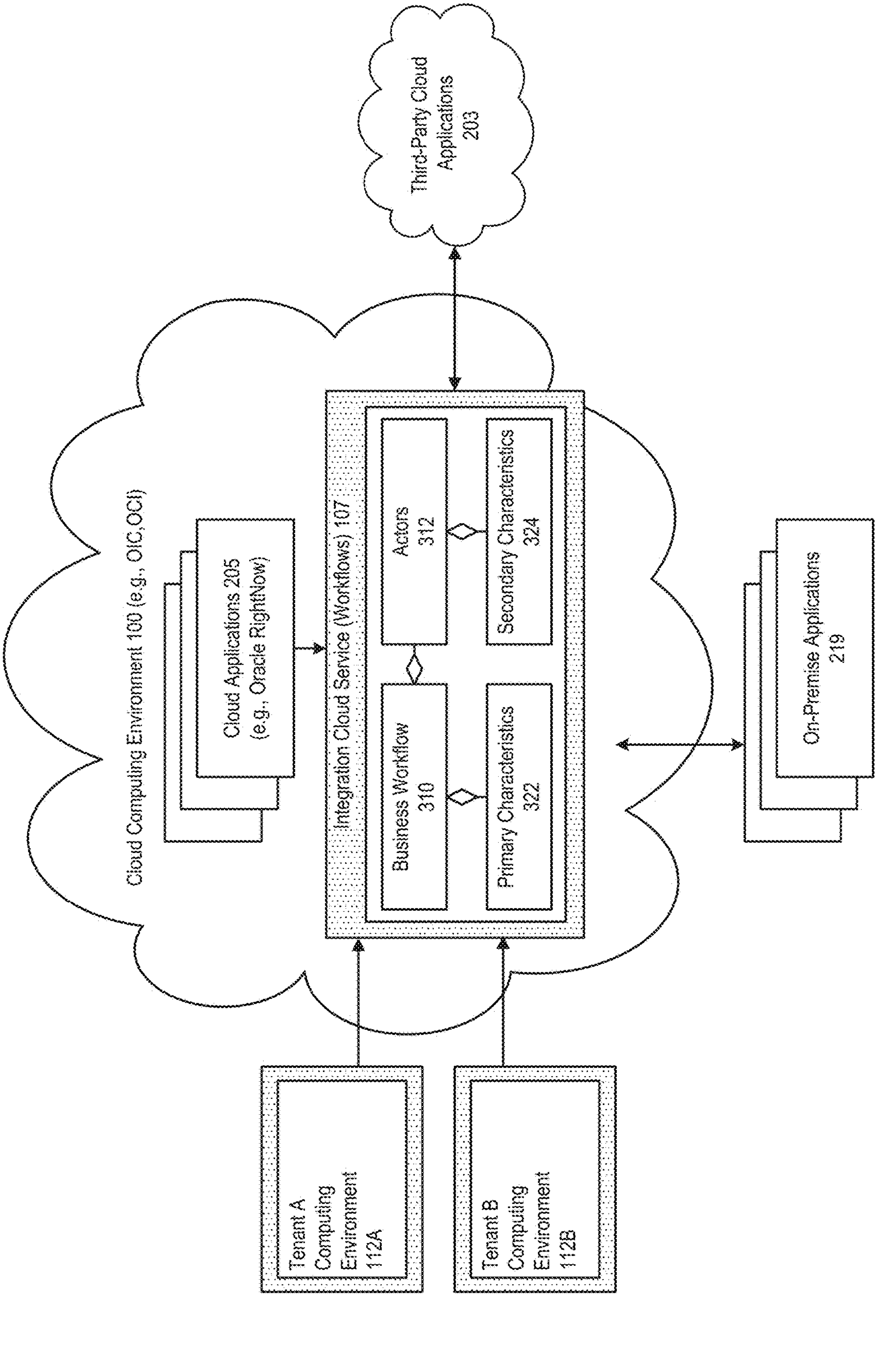
FIG. 5 illustrates various examples of characteristics associated with integration cloud service workflows, in accordance with an embodiment.
Figure 6:
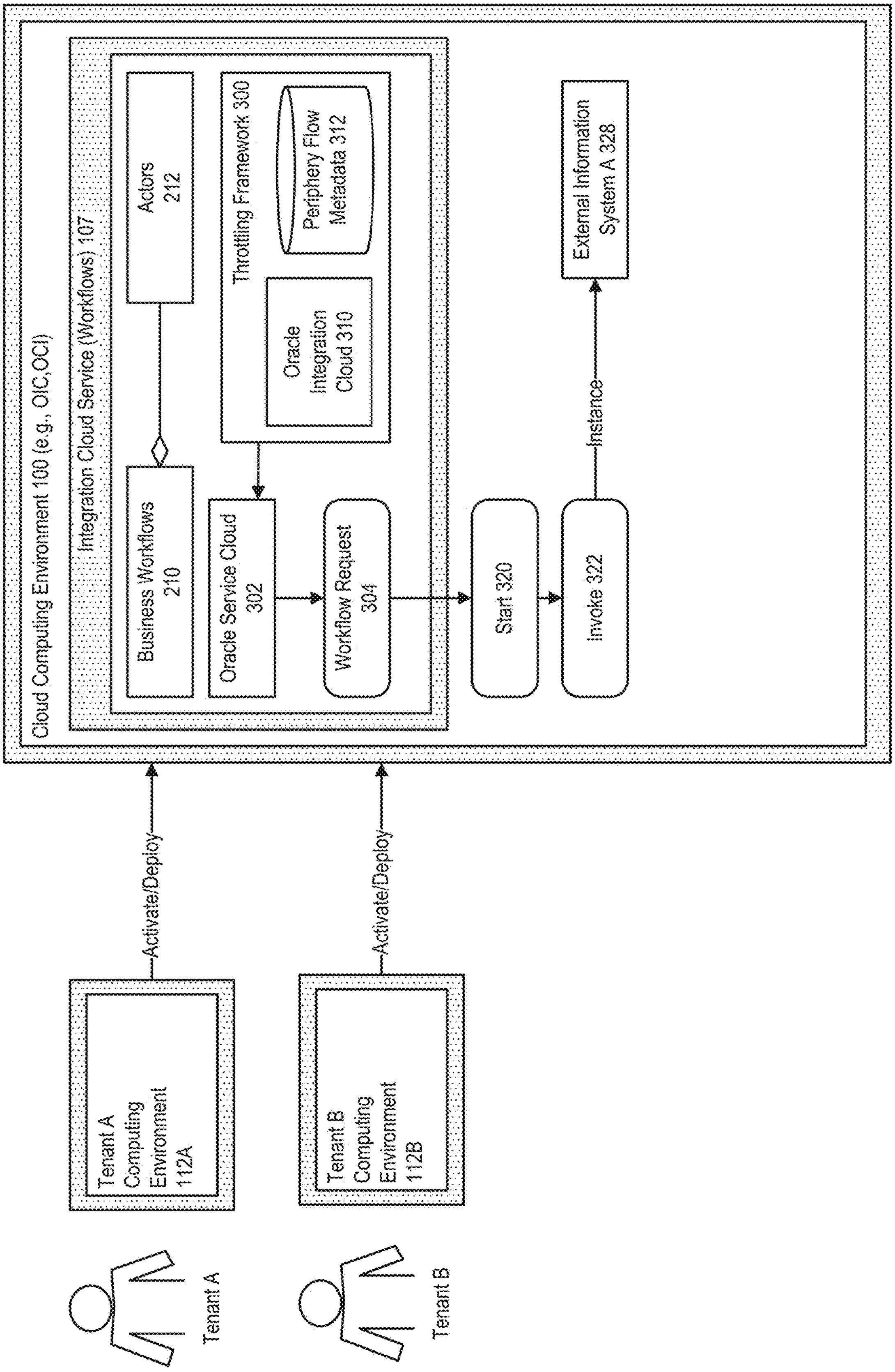
FIG. 6 illustrates a system for dynamic throttling of workflows based on integrated applications, in accordance with an embodiment.
Figure 7:
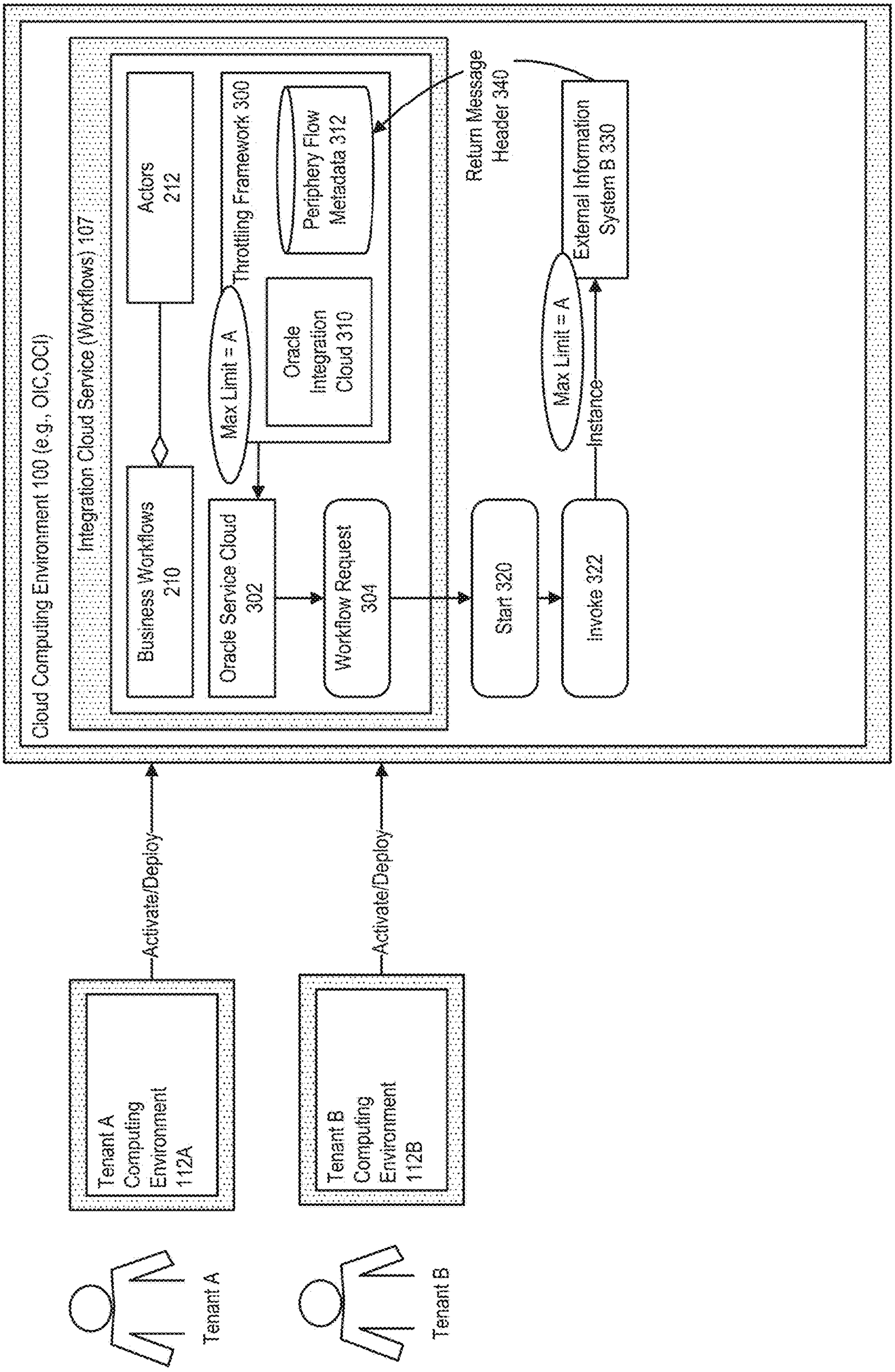
FIG. 7 further illustrates a system for dynamic throttling of workflows based on integrated applications, in accordance with an embodiment.
Figure 8:
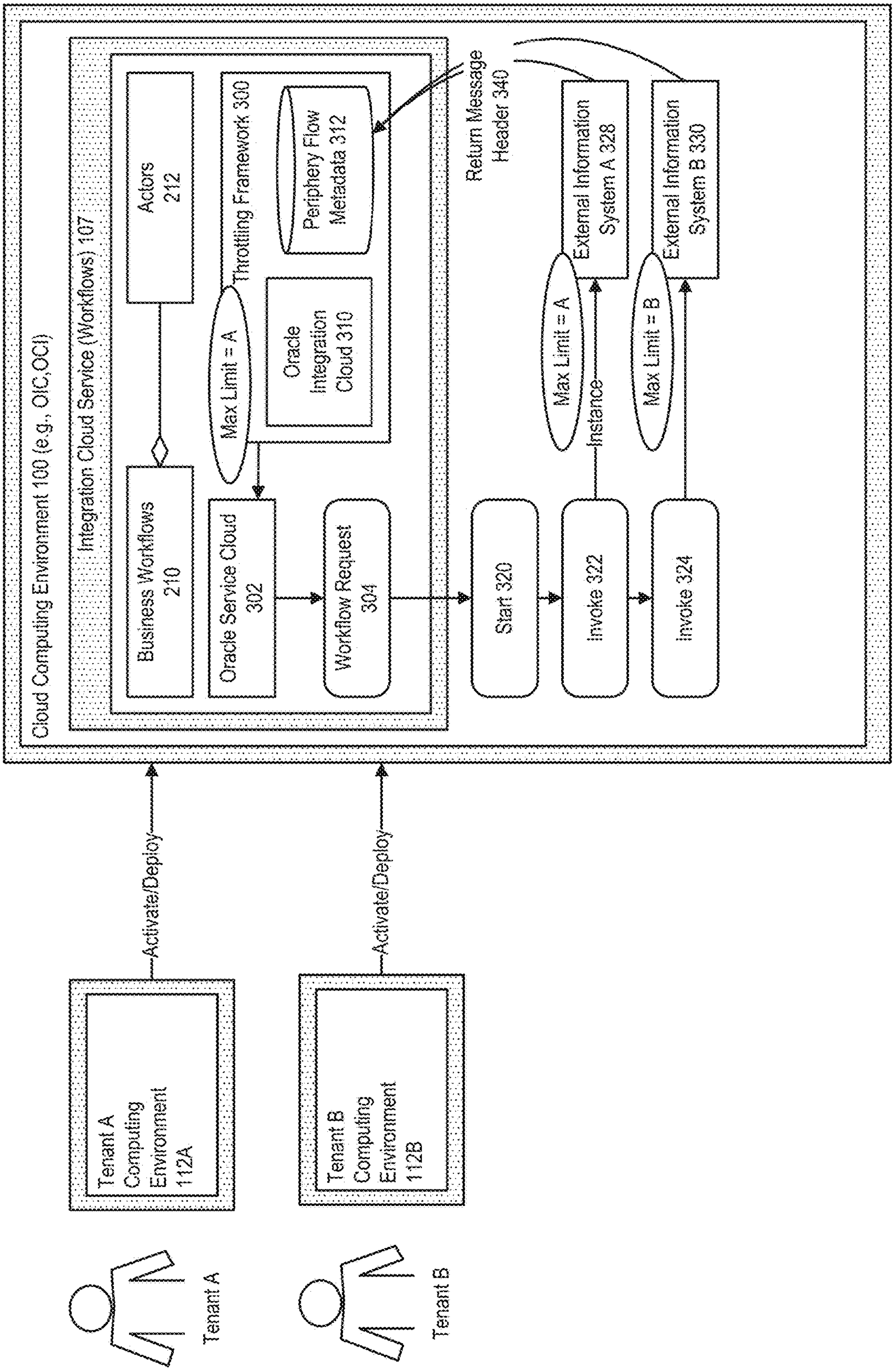
FIG. 8 further illustrates a system for dynamic throttling of workflows based on integrated applications, in accordance with an embodiment.
Figure 9:
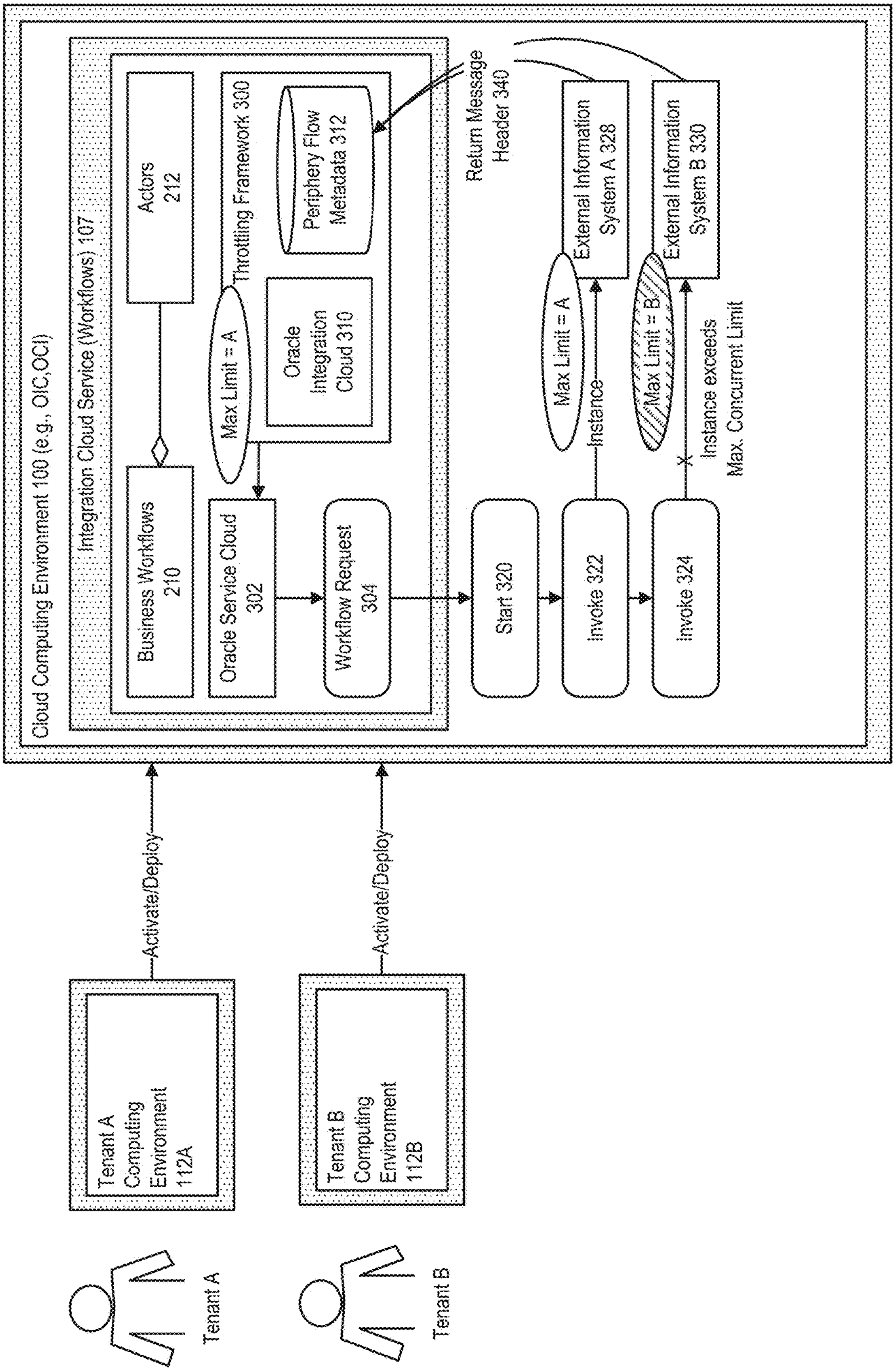
FIG. 9 further illustrates a system for dynamic throttling of workflows based on integrated applications, in accordance with an embodiment.
Figure 10:
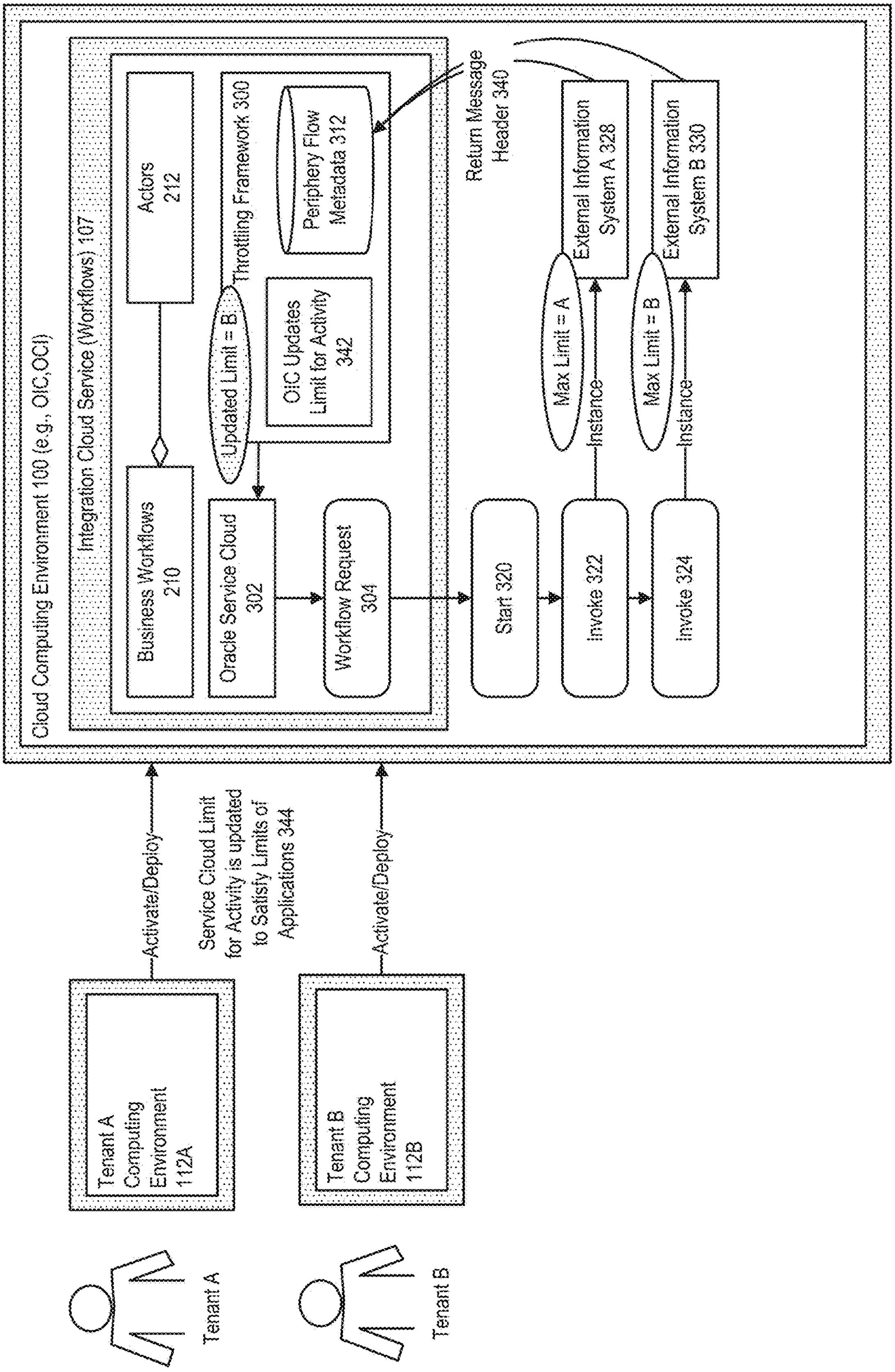
FIG. 10 further illustrates a system for dynamic throttling of workflows based on integrated applications, in accordance with an embodiment.
Figure 11:
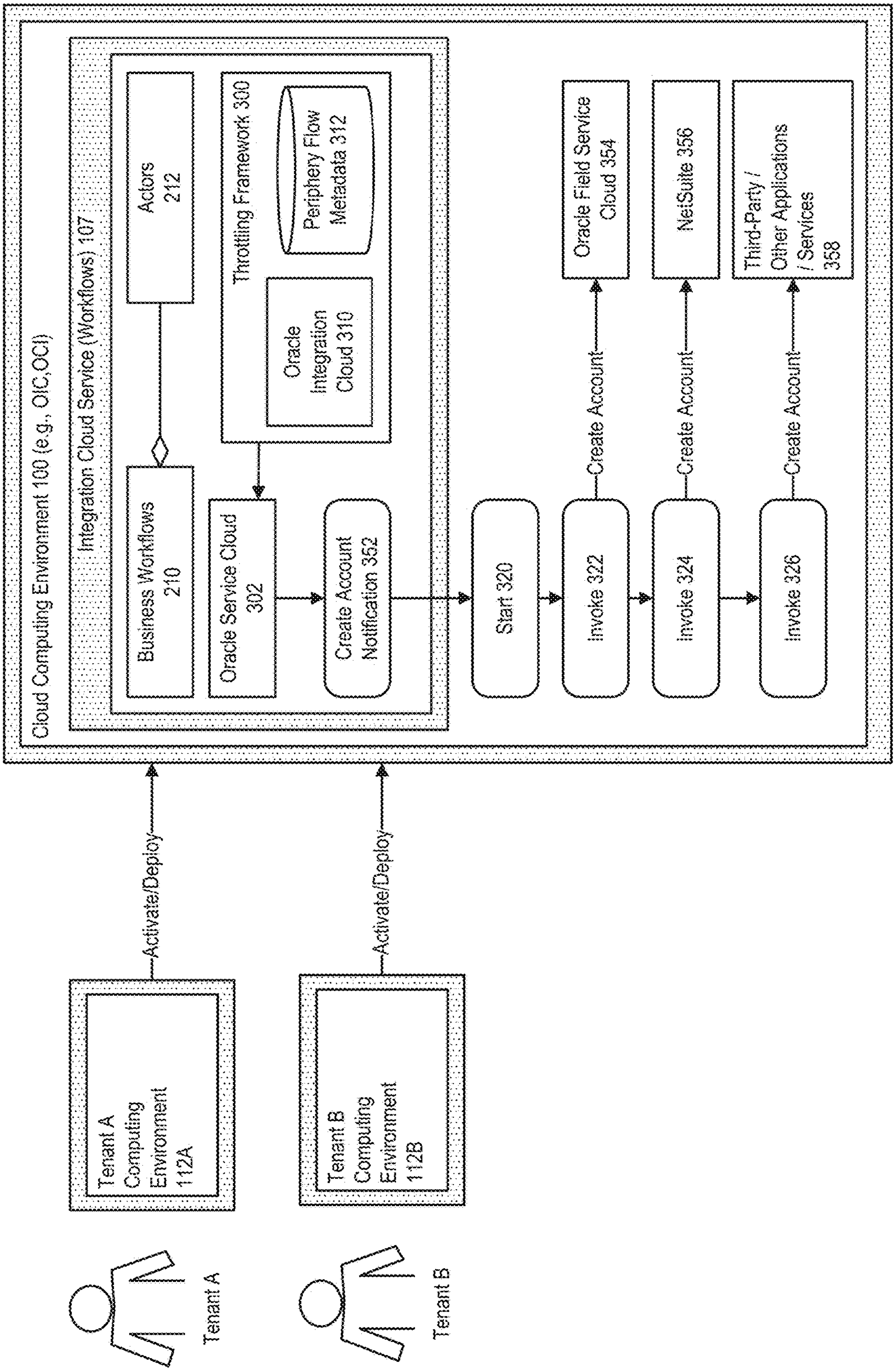
FIG. 11 illustrates an example use of a system for dynamic throttling of workflows based on integrated applications, in accordance with an embodiment.
Figure 12:
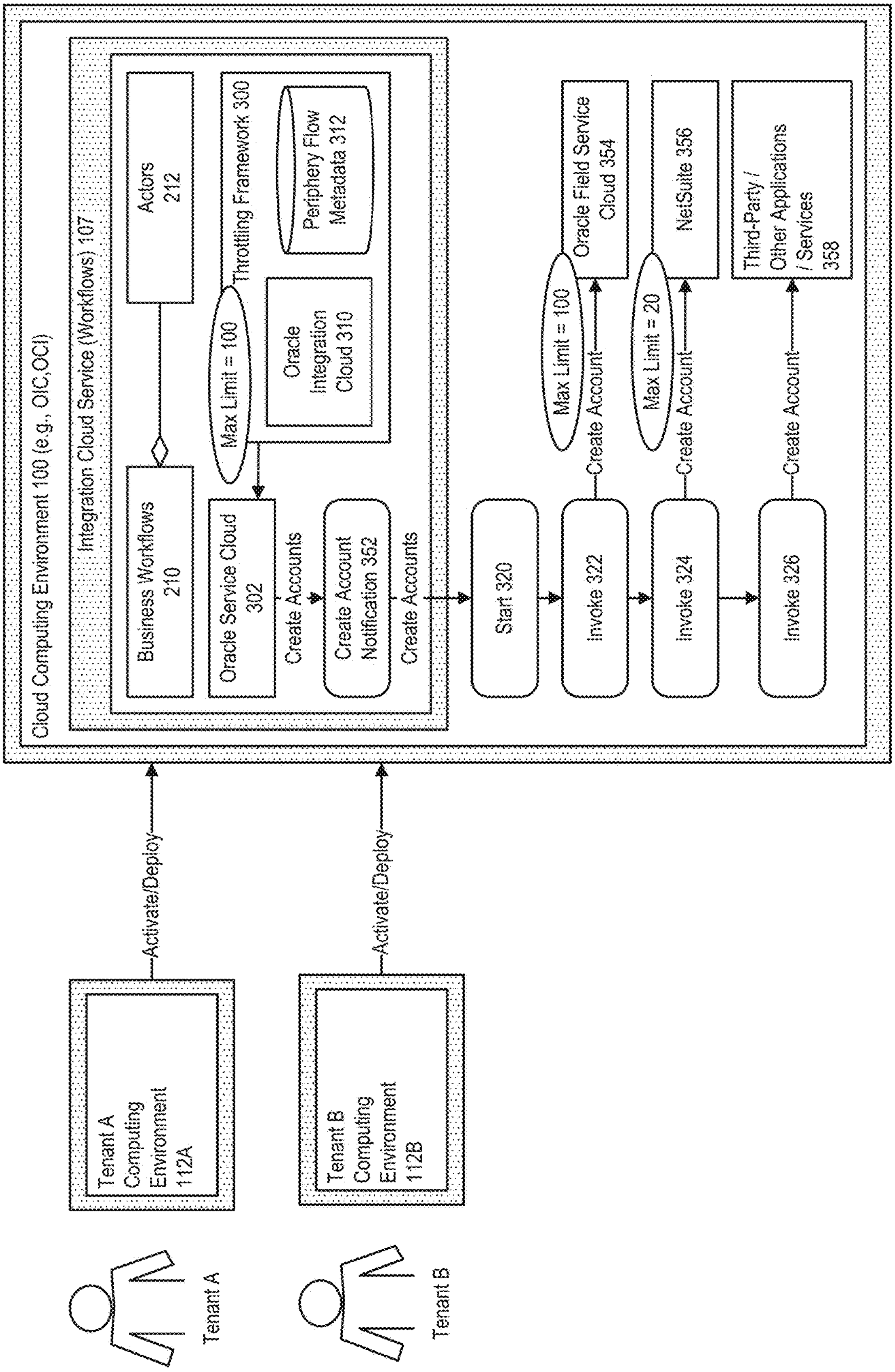
FIG. 12 further illustrates an example use of a system for dynamic throttling of workflows based on integrated applications, in accordance with an embodiment.
Figure 13:
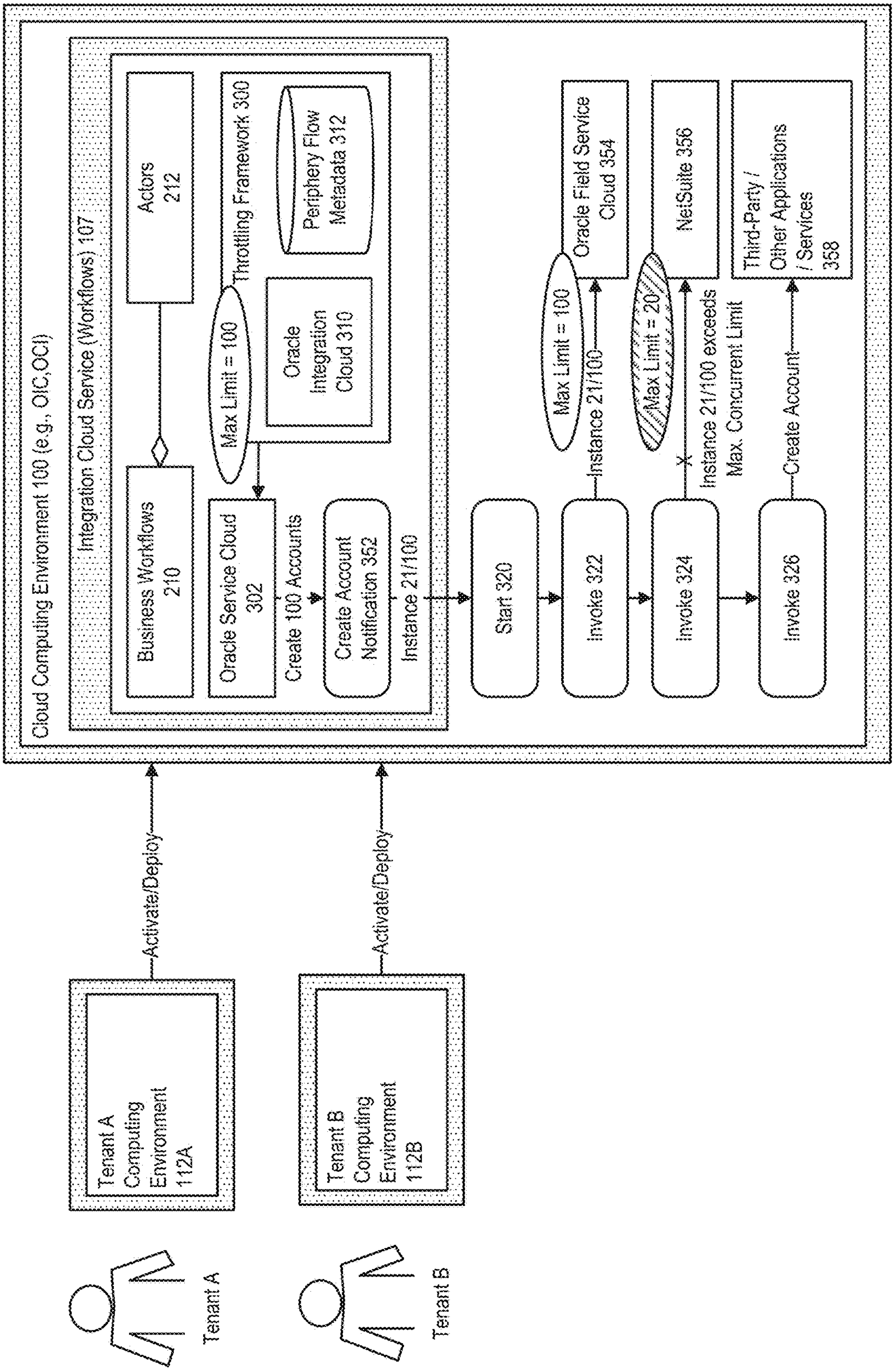
FIG. 13 further illustrates an example use of a system for dynamic throttling of workflows based on integrated applications, in accordance with an embodiment.
Figure 14:
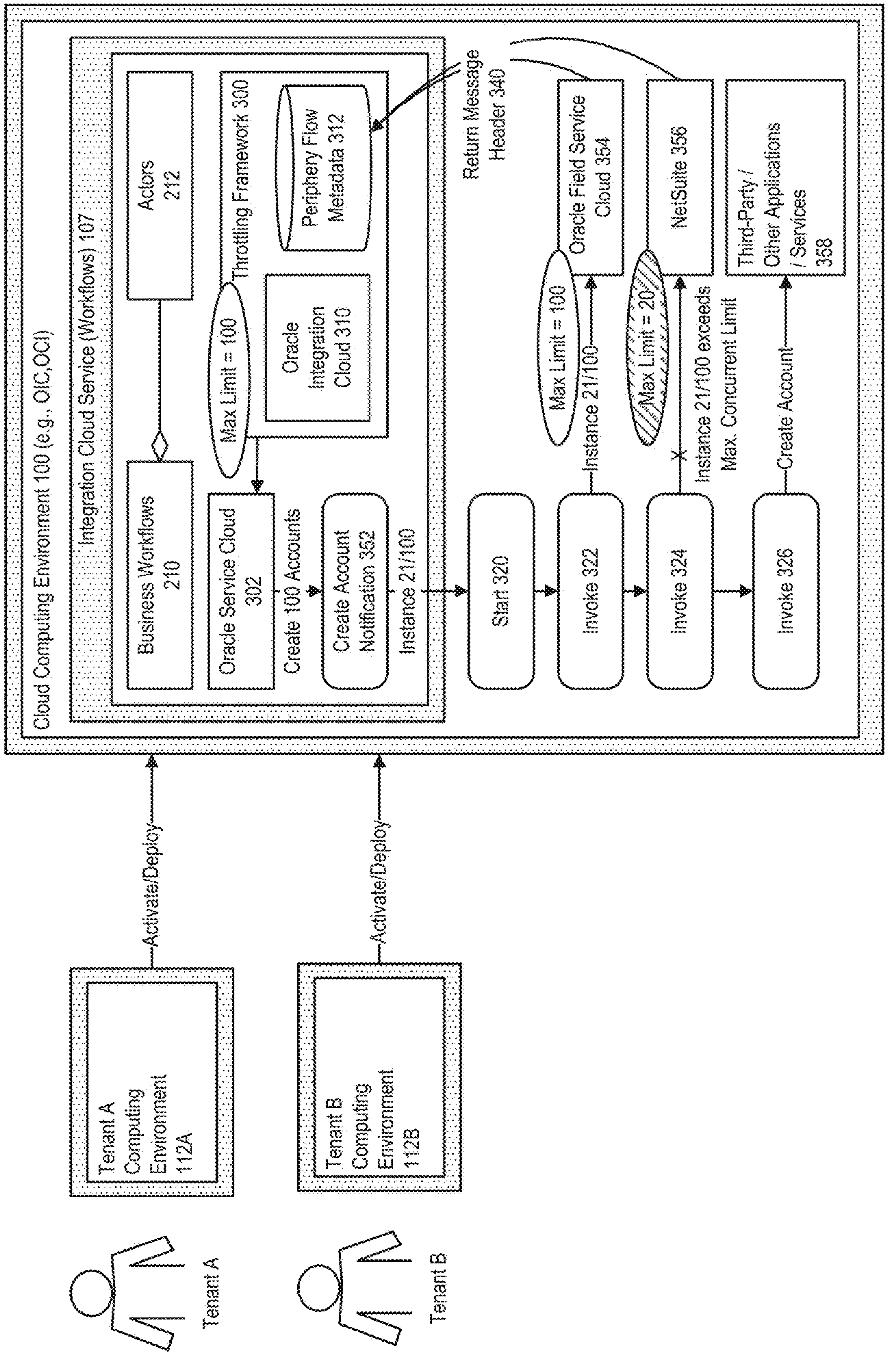
FIG. 14 further illustrates an example use of a system for dynamic throttling of workflows based on integrated applications, in accordance with an embodiment.
Figure 15:
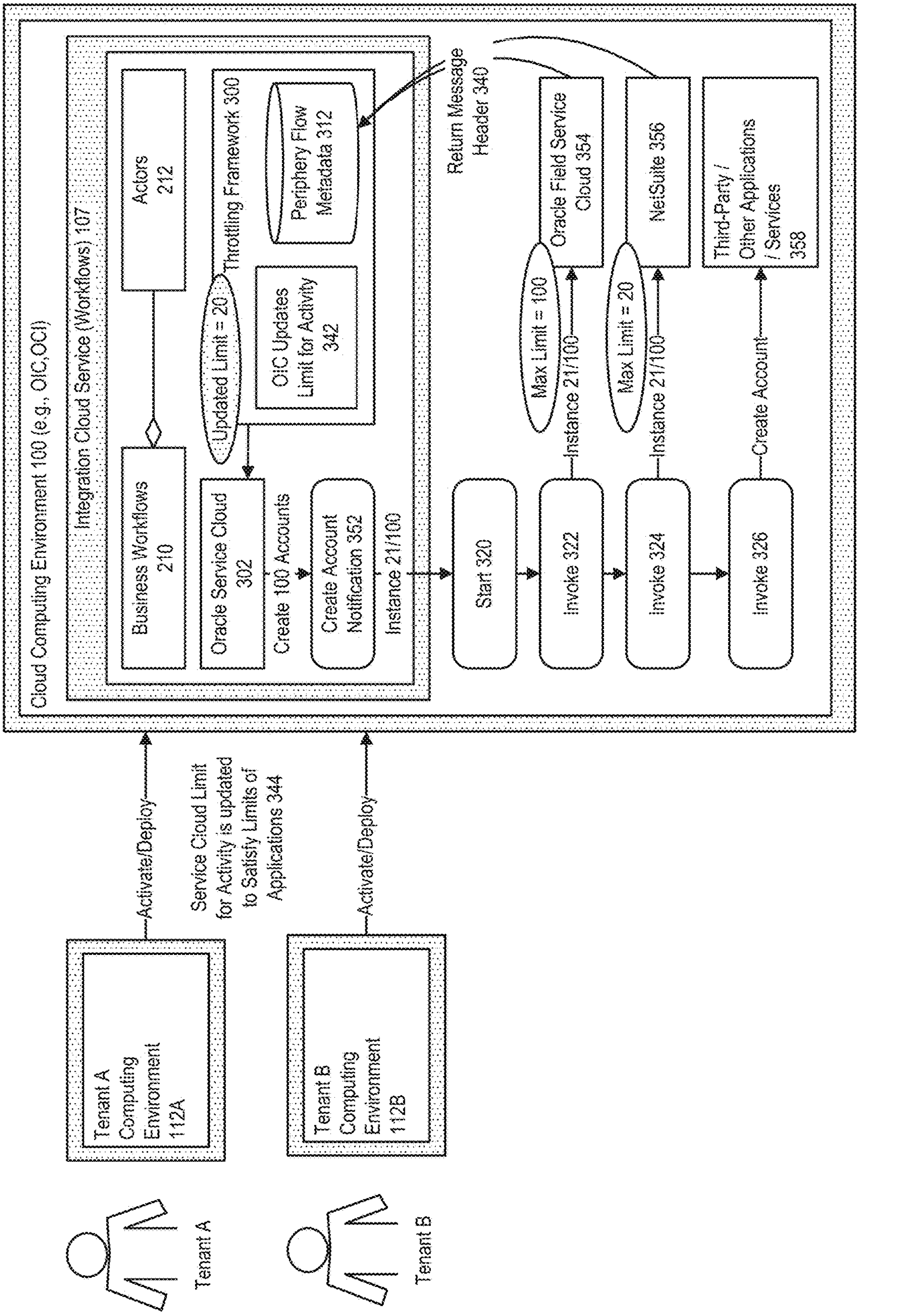
FIG. 15 further illustrates an example use of a system for dynamic throttling of workflows based on integrated applications, in accordance with an embodiment.

FIG. 5 illustrates various examples of characteristics associated with integration cloud service workflows, in accordance with an embodiment.

As illustrated in FIG. 5, in accordance with an embodiment, each business workflow or integration flow 312 comprises several actors 312. For example, these actors could be external systems the workflow integrates with to achieve the business objectives. Each of the actors within a workflow has characteristics, for example one or more primary characteristics 320 and/or secondary characteristics 322, as further described below. The union of the characteristics of each actor in a workflow, along with the characteristics of the workflow itself, collectively is defined as the characteristics of a workflow.

In accordance with an embodiment, definitions of business workflows or integration flows can be stored or persisted as integration archives in various repositories, such as, for example, repositories of a tenant's own integration instance, repositories of an integration marketplace, and/or community repositories.

In accordance with an embodiment, the systems and methods described herein enable discoverability of such workflows, and provide integration cloud consumers with an ability to search for workflows based on several dimensions, thereby promoting reuse of pre-built workflows, and reducing the cost of development.

In accordance with an embodiment, the systems and methods can be used to allow an integration platform to recommend pre-built workflows based on the existing integration assets of an integration platform consumer.

Dynamic Throttling of Workflows

An integration cloud service benefits when its applications, technologies, and processes, including the use of external information systems, can be optimally integrated to create business workflows. External information systems typically impose limits on their APIs, to ensure fair usage. Such limits may be dependent on a customer subscription and complexity of the API (for example, the time to process request, or database operations, CPU, or memory usage). Once these limits are reached, the system starts to throttle incoming requests, to protect from over-utilization of those external information systems.

Some external information systems impose penalties on clients that are trying to send multiple requests, for example by blocking the source application sending these requests. In the case of an iPaaS automated business workflow, the source application may be the cloud platform itself which would face such penalties. This can lead to situations whereby the invocation of a required external system may fail when the system is throttling incoming requests—which could result in the business workflow being in an incomplete or inconsistent state.

FIGS. 6-10 illustrate a system for dynamic throttling of workflows based on integrated applications, in accordance with an embodiment.

As illustrated in FIGS. 6-10, in accordance with an embodiment, a business workflow 210 involving actors 212 is triggered whenever a workflow request 304 is processed (e.g., in Oracle Service Cloud 302); the workflow then performs a series of invocations 320, 322, 324, 326, to invoke a first external information system A 328; and subsequently a second external information system B 330; and/or in other components, for example third-party or other software applications or services.

In accordance with an embodiment, the integration cloud service, first external information system, and second external information system B, can each accept a particular rate or inflow of concurrent requests. The integration cloud service operates to enforce constraints on execution parameters, such as fixed limits for integration flows, and then evolve the limits behavior based on response messages from target applications, for example external information systems. Such applications or information systems often send documented headers in their responses. The system can include a throttling framework 300, by which the integration cloud service (in this example, Oracle Integration Cloud 310) operates to update and then use a periphery flow metadata 312, based on information contained in such response headers, to control the execution of the integration flow.

For example, in accordance with an embodiment, the following information is typically available in response headers received from target applications, for example external information systems: (A) Total quota for window: a total number of requests allowed in a given window. (B) Available quota in current window: a number of requests that can be made in the current window. (C) Next reset interval: a time after which more tokens will be made available for request processing.

In accordance with an embodiment, as requests associated with an integration flow (e.g., requests to create accounts) are processed, and responses are received from target applications, for example external information systems, the integration cloud service reads the various response headers 340 from those applications or systems, and updates its periphery flow metadata with received values. The integration cloud service or other limits enforcement service provided at the periphery can update a limit for an activity 342 (such as account creation) and continue appropriately.

In accordance with an embodiment, the system can use application adapters that are responsible for discerning target application or system throttle parameters, if available. The adapters will update this information to the throttling framework so that effective limits can be imposed.

In accordance with an embodiment, on response from target system, the framework will read response code and headers as per target system throttle policy and notify a connectivity-guard to update the effective limits. At the periphery, limits check will now further check updated overrides from adapter. In this way adapting to limits and rejecting requests at periphery, the approach can protect an integration cloud platform from running business workflows that can land into a state which can cause issues as listed above.

Example Throttling of Workflows

FIGS. 11-15 illustrate an example use of a system for dynamic throttling of workflows based on integrated applications, in accordance with an embodiment.

In particular FIGS. 11-15 illustrate an example use of an integration cloud service, wherein a business workflow 210 involving actors 212 is triggered whenever a new account is created 352 (e.g., in Oracle Service Cloud 302); the workflow then performs a series of invocations 320, 322, 324, 326, to create a new account in a first external information system (e.g., Oracle Field Service Cloud 354); and subsequently a new account in a second external information system (e.g., NetSuite 356); and/or in other components, for example third-party or other software applications or services 358.

In the illustrated example, the integration cloud service can accept an inflow of up to 100 concurrent requests, i.e., the integration flow can be triggered up to 100 times if 100 accounts are created in Oracle Service Cloud.

If we assume that Oracle Field Service Cloud can also accept up to 100 concurrent requests, while Oracle NetSuite can only accept up to 20 concurrent requests, beyond which it will start to throttle incoming requests; then in the event when 100 new accounts are created in Oracle Service Cloud, this will result in 100 concurrent invocations of the integration flow described above. However, only 20 of the 100 concurrent instances of the integration flow will be able to create a contact in Oracle NetSuite, after which NetSuite will start throttling incoming request to create additional accounts, resulting in the remaining (21+) instances failing during account creation.

To address the above scenario, in accordance with an embodiment, the integration cloud service operates to enforce constraints on execution parameters, such as fixed limits for integration flows, and then evolve the limits behavior based on response messages from target applications, for example external information systems. Such applications or information systems often send documented headers in their responses. The system can include a throttling framework 300, by which the integration cloud service (in this example, Oracle Integration Cloud 310) operates to update and then use a periphery flow metadata 312, based on information contained in such response headers, to control the execution of the integration flow.

For example, in accordance with an embodiment, the following information is typically available in response headers received from target applications, for example external information systems: (A) Total quota for window: a total number of requests allowed in a given window. (B) Available quota in current window: a number of requests that can be made in the current window. (C) Next reset interval: a time after which more tokens will be made available for request processing.

In accordance with an embodiment, as requests associated with an integration flow (e.g., requests to create accounts) are processed, and responses are received from target applications, for example external information systems, the integration cloud service reads the various response headers 340 from those applications or systems, and updates its periphery flow metadata with received values. The integration cloud service or other limits enforcement service provided at the periphery can update a limit for an activity 342 (such as account creation) and continue appropriately.

In accordance with an embodiment, the effective limit for a particular integration flow can be derived through a function dependent on the limits associated with the target applications, for example external information systems, for example as min (fieldServiceLimit, netSuiteLimit, oicLimit). In the illustrated example, the effective limit would be min (100, 20, 100)=20. In this way the service cloud limit for the particular integration flow or activity is updated dynamically by the integration cloud service to satisfy the various limits of the applications 344, for example the external information systems.

By way of example, consider 200 integration flow requests are originally received, with an available quota of 10, and a next reset interval of 30 seconds; then a subsequent 10 requests will be allowed in 30 seconds for the workflow. A response header may indicate an available quota of 0, and a next reset interval of 30 seconds; in which case the integration cloud service will then reject subsequent invocations of the workflow for the next 30 seconds.

Figure 16:
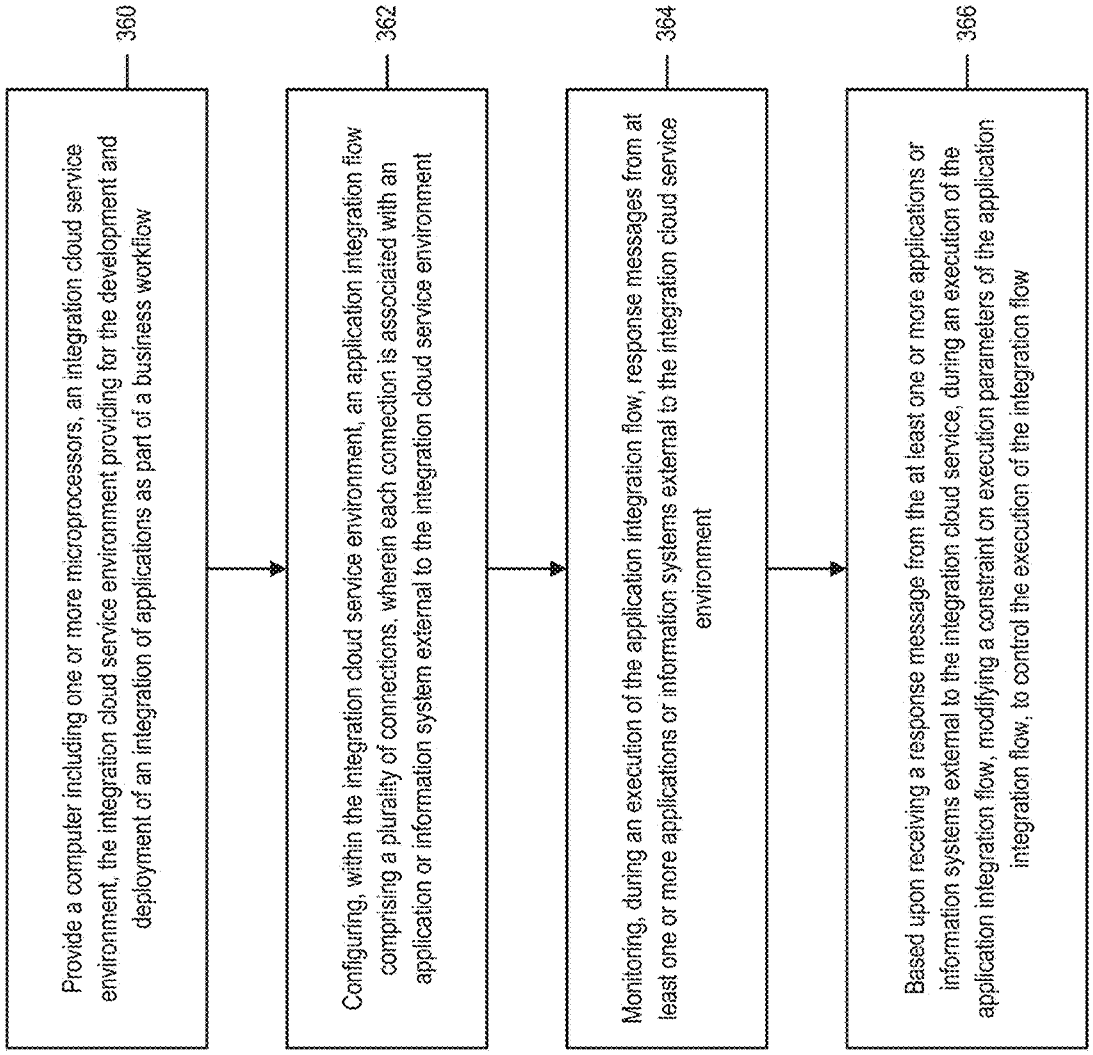
FIG. 16 illustrates a process for dynamic throttling of workflows based on integrated applications, in accordance with an embodiment.

FIG. 16 illustrates a process for dynamic throttling of workflows based on integrated applications, in accordance with an embodiment.

As illustrated in FIG. 16, in accordance with an embodiment, at step 360, at a computer including one or more microprocessors, an integration cloud service environment is provided, the integration cloud service environment providing for the development and deployment of an integration of applications as part of a business workflow.

At step 362, within the integration cloud service environment, an application integration flow is configured comprising a plurality of connections, wherein each connection is associated with an application or information system external to the integration cloud service environment.

At step 364, the process monitors, during an execution of the application integration flow, response messages from at least one or more applications or information systems external to the integration cloud service environment.

At step 366, based upon receiving a response message from the at least one or more applications or information systems external to the integration cloud service, during an execution of the application integration flow, the process modifies a constraint on execution parameters of the application integration flow, to control the execution of the integration flow.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may be implemented in a processor configured to perform particular functions using instructions stored e.g., on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention.

Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for dynamic throttling of workflows within an integration cloud service environment, comprising:

a computer comprising a microprocessor, and an integration cloud service environment provided thereon, the integration cloud service environment providing for the development and deployment of an integration of applications as part of a business workflow; and a throttling framework by which the integration cloud service environment operates to update and then use a periphery flow metadata based on information contained in response headers, to control the execution of an application integration flow;

wherein the system operates by:

configuring, within the integration cloud service environment, the application integration flow comprising:

a plurality of connections, for use with applications or information systems external to the integration cloud service environment, wherein each connection, of the plurality of connections, is associated with an application or information system external to the integration cloud service environment;

placing a constraint on execution parameters of the application integration flow, including one or more of a quota or maximum number of concurrent requests or requests within a preset or current time period;

monitoring, during an execution of the application integration flow, a response message from at least one or more of the applications or information systems external to the integration cloud service environment, including an indication of the quota or maximum number of concurrent requests or requests allowed for the at least one or more of the applications or information systems within the preset or current time period; and based upon receiving the response message from the at least one or more applications or information systems external to the integration cloud service, during the execution of the application integration flow, and the information contained in the response headers, modifying the constraint on execution parameters of the application integration flow, including updating the periphery flow metadata used by the throttling framework, to control the execution of the application integration flow.

2. The system of claim 1, wherein the constraint on the execution parameters of the application integration flow is at least one of:

a maximum number of concurrent requests, a maximum number of requests for a preset time period, a maximum number of requests for a current time period, and a reset period for creation of new tokens for handling of new requests.

3. The system of claim 2, wherein the constraint on the execution parameter of the application integration flow is received within a header of the response message.

4. The system of claim 3, wherein the integration cloud service environment is a multi-tenant environment; and wherein the alteration to the constraint on execution parameters of the application integration flow is applied across each tenant of a plurality of tenants.

5. The system of claim 2, further comprising:

configuring, within the integration cloud service environment, a second application integration flow, the second application integration flow comprising a second plurality of connections, wherein each connection is associated with an application external to the integration cloud service environment;

placing a second constraint on execution parameters of the second application integration flow;

based upon receiving the response message from the at least one application external to the integration cloud service environment based upon the execution of the application service flow, altering the second constraint on execution parameters of the second application integration flow.

6. The system of claim 1, wherein as requests associated with an integration flow are processed, and responses are received from target applications or external information systems, the integration cloud service reads response headers from the target applications or external information systems, and updates a periphery flow metadata with values received in the response headers, for use by the integration cloud service or other limits enforcement service provided at the periphery to update a limit for an activity and continue appropriately.

7. The system of claim 1, wherein the integration cloud service is provided as or in association with a platform-as-a-service (iPaaS) platform that allows a user to design, activate, and manage a business workflow that uses integration artifacts.

8. The system of claim 1, wherein the system can use application adapters that are responsible for discerning target application or system throttle parameters, and updating said target application or system throttle parameters to the throttling framework so that effective limits can be imposed.

9. The system of claim 1, wherein the application integration flow is used in creating integration cloud accounts, including that the application integration flow performs a series of invocations to create a new account encompassing a plurality of applications or information systems external to the integration cloud service environment, each of which are associated with a particular service limit.

10. A method for dynamic throttling of workflows within an integration cloud service environment, comprising:

providing, at a computer comprising a microprocessor, an integration cloud service environment, the integration cloud service environment providing for the development and deployment of an integration of applications as part of a business workflow;

providing a throttling framework by which the integration cloud service environment operates to update and then use a periphery flow metadata based on information contained in response headers, to control the execution of an application integration flow;

configuring, within the integration cloud service environment, the application integration flow comprising a plurality of connections, for use with applications or information systems external to the integration cloud service environment, wherein each connection, of the plurality of connections, is associated with an application or information system external to the integration cloud service environment;

placing a constraint on execution parameters of the application integration flow, including one or more of a quota or maximum number of concurrent requests or requests within a preset or current time period;

monitoring, during an execution of the application integration flow, a response message from at least one or more of the applications or information systems external to the integration cloud service environment, including an indication of the quota or maximum number of concurrent requests or requests allowed for the at least one or more of the applications or information systems within the preset or current time period; and based upon receiving the response message from the at least one or more applications or information systems external to the integration cloud service, during the execution of the application integration flow, and the information contained in the response headers, modifying the constraint on execution parameters of the application integration flow, including updating the periphery flow metadata used by the throttling framework, to control the execution of the application integration flow.

11. The method of claim 10, wherein the constraint on the execution parameters of the application integration flow is at least one of:

a maximum number of concurrent requests, a maximum number of requests for a preset time period, a maximum number of requests for a current time period, and a reset period for creation of new tokens for handling of new requests.

12. The method of claim 11, wherein the constraint on the execution parameter of the application integration flow is received within a header of the response message.

13. The method of claim 12, wherein the integration cloud service environment is a multi-tenant environment; and wherein the alteration to the constraint on execution parameters of the application integration flow is applied across each tenant of a plurality of tenants.

14. The method of claim 11, further comprising:

configuring, within the integration cloud service environment, a second application integration flow, the second application integration flow comprising a second plurality of connections, wherein each connection is associated with an application external to the integration cloud service environment;

placing a second constraint on execution parameters of the second application integration flow;

based upon receiving the response message from the at least one application external to the integration cloud service environment based upon the execution of the application service flow, altering the second constraint on execution parameters of the second application integration flow.

15. The method of claim 10, wherein as requests associated with an integration flow are processed, and responses are received from target applications or external information systems, the integration cloud service reads response headers from the target applications or external information systems, and updates a periphery flow metadata with values received in the response headers, for use by the integration cloud service or other limits enforcement service provided at the periphery to update a limit for an activity and continue appropriately.

16. The method of claim 10, wherein the integration cloud service is provided as or in association with a platform-as-a-service (iPaaS) platform that allows a user to design, activate, and manage a business workflow that uses integration artifacts.

17. The method of claim 10, wherein the system can use application adapters that are responsible for discerning target application or system throttle parameters, and updating said target application or system throttle parameters to the throttling framework so that effective limits can be imposed.

18. The method of claim 10, wherein the application integration flow is used in creating integration cloud accounts, including that the application integration flow performs a series of invocations to create a new account encompassing a plurality of applications or information systems external to the integration cloud service environment, each of which are associated with a particular service limit.

19. A non-transitory computer readable storage medium, having instructions for determination of workflows based on characteristics in an integration environment, which when read an executed cause a computer to perform a method comprising:

providing, at a computer comprising a microprocessor, an integration cloud service environment, the integration cloud service environment providing for the development and deployment of an integration of applications as part of a business workflow;

providing a throttling framework by which the integration cloud service environment operates to update and then use a periphery flow metadata based on information contained in response headers, to control the execution of an application integration flow;

configuring, within the integration cloud service environment, the application integration flow comprising a plurality of connections, for use with applications or information systems external to the integration cloud service environment, wherein each connection, of the plurality of connections, is associated with an application or information system external to the integration cloud service environment;

placing a constraint on execution parameters of the application integration flow, including one or more of a quota or maximum number of concurrent requests or requests within a preset or current time period;

monitoring, during an execution of the application integration flow, a response message from at least one or more of the applications or information systems external to the integration cloud service environment, including an indication of the quota or maximum number of concurrent requests or requests allowed for the at least one or more of the applications or information systems within the preset or current time period; and based upon receiving the response message from the at least one or more applications or information systems external to the integration cloud service, during the execution of the application integration flow, and the information contained in the response headers, modifying the constraint on execution parameters of the application integration flow, including updating the periphery flow metadata used by the throttling framework, to control the execution of the application integration flow.

20. The non-transitory computer readable storage medium of claim 19, wherein as requests associated with an integration flow are processed, and responses are received from target applications or external information systems, the integration cloud service reads the various response headers from those applications or systems, and updates a periphery flow metadata with received values, for use by the integration cloud service or other limits enforcement service provided at the periphery to update a limit for an activity and continue appropriately.

* * * * *